United States Patent [19]
Prior et al.

[11] Patent Number: 4,889,623
[45] Date of Patent: Dec. 26, 1989

[54] BRINING SYSTEM

[75] Inventors: William C. Prior, Chagrin Falls; Ellis, III: George S., Chardon; David W. Crozier, Highland Heights, all of Ohio

[73] Assignee: Kinetico, Inc., Newbury, Ohio

[21] Appl. No.: 115,713

[22] Filed: Nov. 2, 1987

[51] Int. Cl.$^4$ .............................................. C02B 1/22
[52] U.S. Cl. ................................. 210/190; 137/513.5; 137/514; 137/523
[58] Field of Search .............................. 210/191, 190; 137/513.5, 514, 523

[56] References Cited

U.S. PATENT DOCUMENTS

| | | | |
|---|---|---|---|
| 3,163,394 | 12/1964 | Downin | 251/120 |
| 3,185,302 | 5/1965 | Kryzer | 210/126 |
| 3,326,377 | 6/1967 | Abos | 210/126 |
| 3,424,311 | 1/1969 | Siedenburg | 210/86 |
| 3,891,552 | 6/1975 | Prior | 210/88 |
| 4,147,629 | 4/1979 | Geurtsen | 210/104 |
| 4,336,134 | 6/1982 | Prior | 210/127 |

*Primary Examiner*—David L. Lacey
*Assistant Examiner*—Thi Dang
*Attorney, Agent, or Firm*—Watts, Hoffmann, Fisher & Heinke Co.

[57] ABSTRACT

A brining system including a brine reservoir containing a supply of salt and a brine valve assembly disposed in the reservoir below the level of the salt and including a vessel for accumulating a predetermined quantity of fluid to be discharged into the reservoir to form a regeneration solution. A control valve forming part of the brine valve assembly includes a spool member shiftable between two positions. In one position a fluid supply line is communicated with the accumulating vessel and in a second position the vessel is communicated with the brine reservoir. The spool includes effective pressure areas for monitoring pressures in the supply line and the vessel. When a predetermined level in the accumulating vessel is reached, a flow of fluid into the vessel is terminated and the resulting change in pressure sensed by the spool causes it to shift to a position at which fluid in the vessel is discharged into the brine reservoir while fluid flow from the supply line is concurrently terminated. During a regeneration cycle, "suction" pressures generated in the supply line cause the spool to return to its first position. In one embodiment, the vessel includes a check ball controlled vent port whereas in an alternate embodiment an adjustable float mechanism controls the final fluid level in the vessel.

13 Claims, 2 Drawing Sheets

BRINING SYSTEM

TECHNICAL FIELD

This invention relates generally to valves, and in particular, to a brining system used in a water softening apparatus.

BACKGROUND ART

A household water softener system typically includes a resin tank through which hard water passes to exchange its "hard" ions of calcium and magnesium for "soft" sodium ions or other regenerant ions. Regeneration of the resin bed is required periodically to replenish the supply of "soft" ions and to remove the accumulation of "hard" ions from the bed. The regeneration is effected by flushing a brine solution through the resin tank. A water softener of this type is more fully described in U.S. Pat. No. 3,891,552, issued June 24, 1975 to William C. Prior and James W. Kewley, entitled CONTROL VALVE FOR WATER SOFTENERS, the disclosure of which is incorporated herein by reference.

Modern water softeners of the type disclosed in U.S. Pat. No. 3,891,552 typically employ a brine tank which includes a reservoir and a supply of salt disposed at a level above the bottom of the reservoir. A tube connected to a source of water provides a path for supplying water to the reservoir. Upon the attainment of a predetermined level in the reservoir, the water begins dissolving some of the salt supply and creates a source of brine for regeneration of the resin bed. When regeneration is required, the brine is aspirated through the same tube that supplied water to the reservoir. The amount of water introduced to the brine reservoir after a regeneration cycle and the amount of brine aspirated from the reservoir during a regeneration cycle is controlled by a brine valve mechanism.

Many prior art brine valves utilize float arrangements to directly control the level of brine in the brine tank as well as the quantity of brine solution discharged from the brine tank during a regneration cycle. The floats in these prior brine valves are usually exposed to the brine solution. An example of such a brine valve is illustrated in Pat. No. 4,336,134 which is owned by the assignee of the present application. The trend today in water softening equipment is to minimize the quantity of salt and hence brine solution that is used during regeneration and as a consequence, and it therefore is desireable to reduce the volume of brine solution stored in the brine tank. In order for the system to function properly, the volume of fresh water added to the brine tank as well as the quantity of brine solution withdrawn from the tank during regeneration must be precisely controlled. Although the brine valve illustrated in U.S. Pat. No. 4,336,135 operates satisfactorily and has been commercially successful, it has been found that under some conditions, the volume of water added to the reservoir after regeneration varies and as a result the brine solution quantity also varies. These types of brine valves are also sensitive to orientation and if the brine tank is not absolutely level, variations in liquid level will occur that will vary the amount of salt consumed for a given regeneration cycle.

DISCLOSURE OF THE INVENTION

The present invention provides a new and improved brining system and in particular provides a new and improved brine valve assembly that is capable of precisely controlling the amount of brine solution created and used in water treatment system such as a water softener. Unlike most prior art brine valves, the valve assembly of the present invention meters a predetermined volume of fluid (i.e., fresh water) into a brine reservoir in order to provide a precise quantity of brine solution.

In the preferred embodiment, the brine valve assembly for use with a water softening system includes a storage tank or vessel that is used to measure and accumulate a precise, predetermined quantity of fluid such as water that is added or discharged into the brine reservoir to form the brine solution. A valve member, responsive to pressurization and depressurization of a brine supply conduit controls the filling of the vessel and the discharge of the accumulated fluid from the vessel into the brine reservoir.

According to the preferred and illustrated embodiment, the brine valve assembly defines an inlet port through which brine solution is drawn during a regeneration cycle and at least one outlet port through which fluid from the vessel is discharged into the brine reservoir. According to the exemplary embodiment, the valve member for controlling the communication of the storage vessel with the fluid supply line and with the brine reservoir comprises a spool valve that is shiftable between two positions. In one position, the fluid supply line is communicated with the vessel; in the second position the vessel is communicated with the regeneration solution reservoir.

The spool is preferably operated by sensed pressures in the supply line. In the preferred embodiment, the flow path of fluid from the supply line to the vessel includes a check valve which prevents fluid flow from the tank into the supply line when the supply line is depressurized. Regeneration solution is drawn from the brine reservoir through the inlet port whenever the supply line is depressurized below ambient pressure. The check valve in the flow path between the inlet port and the supply line inhibits or prevents fluid flow into the regeneration reservoir from the inlet port when the supply line is pressurized.

According to a feature of the invention, the inlet port includes a valving member which seals off the inlet when the solution level in the brine reservoir is drawn down to a predetermined level. In this way, a precise quantity of brine solution is always drawn from the reservoir during a regeneration cycle. Once the predetermined quantity is drawn, the inlet port is sealed by the valving member to prevent further solution draw.

According to the preferred method of operating, the brining system is started with the valve member in the first position at which the fluid supply line is communicated with the vessel. The brine supply line is normally pressurized when not in the regeneration cycle and as a result, if the vessel is empty it will fill with fluid, i.e., water from the supply line. After the vessel is filled, the valve member shifts to its second position at which the supply line is sealed from the vessel and at which the outlet port is communicated with the vessel so that fluid in the vessel is discharged into the brine reservoir thereby generating a precise quantity of brine solution.

When a regeneration cycle is initiated, the fluid supply line will depressurize and cause brine solution to be drawn from the brine solution reservoir through the inlet port. When the brine solution in the reservoir is lowered to a predetermined level, the valving member seals off the inlet and causes the pressure in the supply line to decrease further. The negative pressure (with respect to ambient) developed in the supply line once the inlet port is sealed, is sensed by the valve member causing it to move to its first position at which the supply line is communicated with the vessel. The check valve, however, in the flow path between the supply line and the vessel prevents air or other fluid from being drawn from the vessel. At the conclusion of the regeneration cycle, the supply line is again pressurized. The check valve allows fluid under pressure from the supply line to flow into the tank until the tank is again filled whereupon the spool valve shifts to the second position. With the spool in the second position, the fluid is discharged from the vessel into the brine reservoir.

In one embodiment of the invention, the vessel comprises a fixed volume tank having a discharge passage at its lower end so that fluid is discharged from the tank under the influence of gravity, when permitted. A check valve controlled vent is located at an uppermost portion of the tank through which air within the tank is discharged as the tank fills with fluid. When the tank is substantially completely filled, the check valve seals the vent thus causing the tank pressure to rise towards the pressure of the supply line. This pressurization is sensed by the valve member and upon sensing a predetermined rise in pressure causes it to shift to its second position at which the outlet port is communicated with the tank to enable the fluid in the tank, under the influence of gravity, to be discharged into the brine reservoir.

In an alternate embodiment, the vessel comprises a tank assembly including a float mechanism that is operatively connected to a valve element for controlling the communication of the fluid supply conduit with the tank. In the alternate embodiment, the valve element is located in a passage located between the tank and the supply conduit. The pressure in the passage is sensed by the spool. When a predetermined quantity of fluid has entered the tank (as determined by the float setting) the float causes the valve element to terminate the communication of the supply conduit with the tank and causes the passage to pressurize. This pressurization is sensed by the valve member and drives it to its second position at which the outlet port is communicated with the tank and causes fluid in the tank to be discharged into the brine reservoir under the influence of gravity. In the alternate embodiment, the tank includes an overflow conduit which, in the event of failure in the valve member, directs the excess fluid communicated to the tank, to a remote location to inhibit or prevent over filling of the brine reservoir.

Additional features of the invention will become apparent and a fuller understanding obtained by reading the following detailed description made in connection with the accompanying drawings.

BEST MODE FOR CARRYING OUT THE INVENTION

Figure 1:
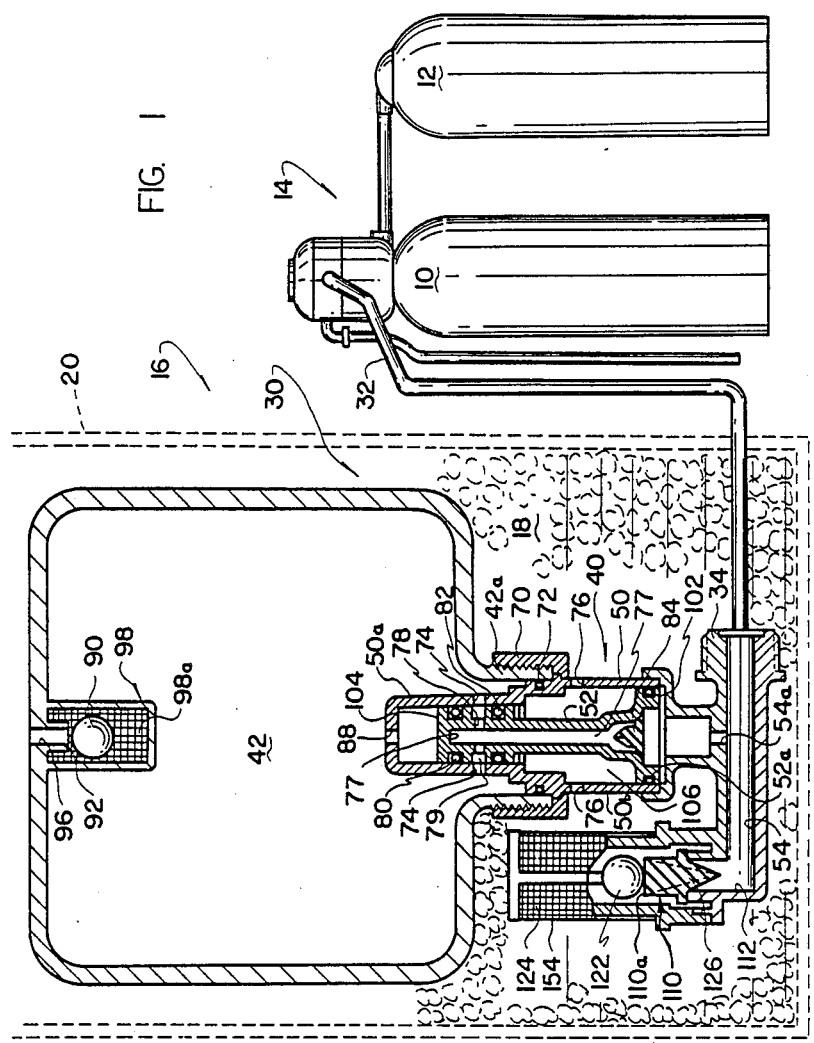
FIG. 1 is a view partly in elevation and partly in section, of a water softening apparatus including a brining system constructed in accordance with the preferred embodiment of the invention; and, FIG. 2 is a view partly in elevation and partly in section, of an alternate embodiment of the embodiment of the brining system.

FIG. 1 illustrates, somewhat schematically, the overall construction of a water softening apparatus embodying the present invention. The illustrated apparatus would be termed a "twin tank" system and includes a pair of resin tanks 10, 12 interconnected by a control valve 14. The control valve may, for example, be of the type disclosed and claimed in U.S. Pat. Nos. 3,891,552 and 4,298,025, which are both owned by the assignee of the present application and which are both hereby incorporated by reference. Among other functions, the control valve 14 controls which of the two tanks is "on-line" and actively treating water and controls the regeneration of an exhausted tank. After a regeneration cycle, the regenerated tank is maintained off-line by the control valve 14 until the on-line tank is exhausted and requires regeneration.

Regeneration of an exhausted tank requires that a regeneration solution be passed through the resin bed in order to displace the ions that were captured during the treating process. The source of regeneration solution is provided by a regeneration reservoir 16. In a water softening system, this unit is usually termed a brine unit. The brine unit 16 includes a tank 20 which normally contains a supply of salt 18 or other source of regenerant ions. A quantity of water is usually added to the tank to form a brine solution near the bottom of the tank. During a regeneration cycle, a quantity of this solution is drawn into the control valve 14 and is passed through the resin bed of an exhausted tank. The flow of water into the regeneration vessel and the flow of brine solution out of the reservoir is controlled by a brine valve assembly 30 constructed in accordance with the preferred embodiment of the invention. Fluids are conveyed between the reservoir 16 and the control valve 14 by a supply line 32, one end of which is connected to the control valve 14, the other end of which is attached to a fitting 34 on the brine valve assembly 30.

The brine valve 30 is disposed near the bottom of the regeneration reservoir 16. The supply of salt may be supported above the brine valve by a support grid (not shown) or alternately, the salt supply completely surrounds the brine valve assembly 30 as shown in FIG. 1.

In the preferred embodiment, the brine valve 30 is located in a brine well 36 (shown in FIG. 2) which in turn is surrounded by the salt supply. The brine well 36 physically protects the valve assembly and also facilitates access to the valve for service or maintenance. The brine well may include one or more openings 38 (shown only in FIG. 2) through which the brine solution enters the well and/or through which water enters the reservoir.

The brine valve assembly 30 includes a valve unit 40 and a vessel or tank 42 defining a predetermined volume. According to one embodiment of the invention, the volume of the tank 42 determines the quantity of regeneration solution generated in the reservoir and hence the amount of solution drawn into the control valve 14 during a regeneration cycle. For this reason, the quantity of solution and the amount of salt consumed during a regeneration cycle can be carefully controlled since precise amounts of fluid as measured and/or determined by the tank 42 are used in creating the regeneration solution.

The valve assembly 40 includes a valve housing 50 that slidably supports a control spool 52. The spool 52 which, as seen in FIG. 1, is vertically oriented is slidable between two positions. The valve unit 40 defines a passage 54 which is connected to the supply line 32. The spool housing includes a cap-like structure 70 that is internally threaded and is adapted to threadedly receive a neck-like portion 42a of the vessel 42. An O-ring 72 seals the connection between the tank and the cap. A narrow segment 50a of the valve housing 50 extends into the interior of the vessel 42 and defines a plurality of radially directed bores 74 that communicate the interior of the spool housing 50 with the inside of the vessesl 42. A plurality of bores 76 are also defined in a lower segment 50b of the spool housing 50 just below the cap and communicate the interior of the housing with the brine tank.

As seen in FIG. 1, the spool 52 includes a central passage 77 terminating in a blind end wall 77a. A cross bore is machined at the upper end of the spool and defines two radial bores 78. The bores 78 communicate the internal passage 77 with the outside of the spool in an isolated region 79 defined between upper and lower O-rings 80, 82, respectively. A check valve 84 which may be of the "duckbill" variety is mounted near or at the bottom of the spool 52 (as viewed in FIG. 1) and allows fluid to enter the internal passage 77 from the supply passage 54 (via branch bore 54a) while preventing reverse flow. With the spool 52 in the lower position, as shown in FIG. 1, fluid from the supply passage flows past the check valve 84 into the internal passage 77 and out the cross bores 78 and into the interior of the vessel via the housing bores 74. A port 88 is formed at the top of the housing segment 50a and vents fluid above the spool 52 into the tank 42.

An air check mounted at or near the top of the vessel 42 includes a buoyant ball check 90, engageable with a seat 92 which communicates with atmosphere through a vent 96. The ball check is captured by a cage 98 including a screen 98a. As the vessel fills with fluid the displaced air is discharged through the passage 96. When the tank fills, the buoyant check valve engages the seat and prevents further discharge of air and/or fluid from the interior of the tank.

When the passage 96 seals, the vessel begins to pressurize and as a result fluid pressure in the supply passage exerts an upwardly directed force on the spool, the magnitude of which is determined by the diameter or effective pressure area 102 of a lower region 52a of the spool 52. In the disclosed embodiment, the effective pressure area 102 to which supply pressure is applied is larger than an upper effective pressure area 104 to which vessel pressure is applied. When sufficient force is developed on the area 102, the spool 52 is shifted to its upper position shown in FIG. 2. In this position, a flow path is established, as indicated by the arrow 100 in FIG. 2 between the vessel outlets 74 formed in the upper segment 50a of the spool housing 50 and the discharge outlets 76 formed in the lower segment 50b via an internal passage 106 defined between the housing 50 and the spool 52. In the disclosed configuration, gravity causes the fluid in a vessel to drain through the ports 74, 76 and the interior passage 106 of the housing 50 into the brine reservoir 20. With the spool 52 in the upper position, (shown in FIG. 2) fluid from the supply passage 54 is prevented from entering the vessel 42. The check valve 84 prevents fluid (or air) from the tank from being drawn into the supply passage when it is depressurized (as occurs during the regeneration cycle).

The supply passage 54 communicates with a port 110 by a short, upwardly directed (as viewed in FIG. 1) passage 112 that connects the port 110 with the supply line 32. The 110 port defines a valve seat for a buoyant valve check 122. The ball check is captured by a cylindrical filter screen 124 that also surrounds the discharge port 110 and valve seat so that fluid entering the port from the brine tank 20 is filtered. A check valve 126 which may be of the "duckbill" variety is mounted near the valve seat 110 and allows fluid flow from the port into the short connecting passage 112 but prevents reverse flow. In the preferred and disclosed embodiment, the "duckbill" check valve and seat 110a are formed in a single element.

When the fluid in the vessel 42 is discharged into the brine reservoir 20, the ball check 122 is lifted from the seat 110a defined at the discharge port 110. When a regeneration cycle is commenced (by the control valve 14) the supply line 32 is normally depressurized and begins drawing solution from the brine reservoir through the inlet port 110 and check valve 122. As the regeneration solution is drawn from the reservoir, the level gradually falls causing the ball check to move towards its associated seat 110a. As the regeneration solution level reaches the top of the seat, the ball check re-engages and seals port 110 preventing further flow of regeneration solution from the reservoir 20. When the ball 122 seals the port 110, a negative pressure or vacuum (with respect to ambient) will be developed in the supply passage. When a predetermined negative pressure is reached, the negative force exerted on the spool 52 (on the effective pressure area 102) will cause it to move to the lower position (shown in FIG. 1). At the conclusion of a regeneration cycle, the supply line 32 is normally repressurized with water and as a result, the vessel 42 again will fill with fluid. The fluid is ultimately discharged into the brine reservoir 20 after the spool 52 shifts to its upper position as explained above.

Figure 2:
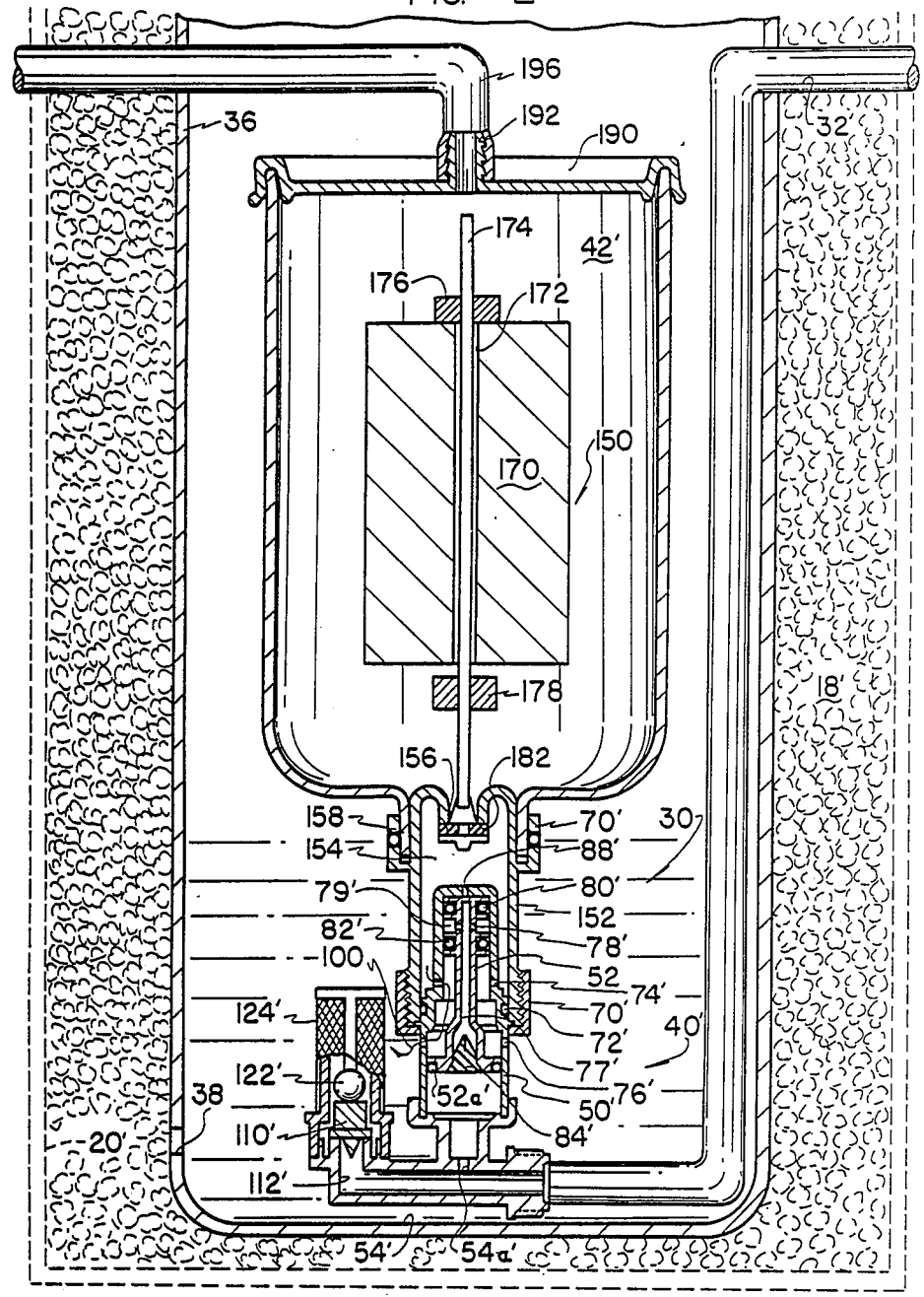

Turning now to FIG. 2, an alternate embodiment of the invention is illustrated. In this embodiment, the amount of fluid accumulated by a fluid vessel 42' forming part of the brine valve assembly 30', is adjustable. To facilitate the explanation, components in the alternate embodiment that are similar in configuration and function as those in the first embodiment will be designated with the same reference character followed by an apostrophe ('). The fluid control spool in both of the embodiments is identical and will be designated by the same reference character (52).

The alternate brine valve assembly 30' includes a brine valve unit 40' connected to a water softener control valve 14 by means of a supply conduit 32'. As in the first embodiment, the brine valve assembly 30' is located at the base of a brine reservoir 20 and in the preferred embodiment may be completely covered with a supply of salt 18'.

In this alternate embodiment, however, a fluid accumulating vessel 42' for measuring and accumulating water to be discharged into the brine reservoir 20 houses a float assembly 150. The vessel 42' is mounted to an extension member 152 which in turn is attached to the brine valve 30'. In the disclosed embodiment, the lower end of the extension member 152 is threadedly received by the cap-like structure 70' forming part of the brine valve 30'. The extension member 152 defines a short interconnecting fluid passage 154 for fluidly communicating the radial ports 74' formed in the housing 50' with the interior of the vessel 42' by way of a float operated shut-off valve 156. The upper end of the extension member 152 receives and seals a downwardly depending neck 158 defined by the vessel 42'.

The float assembly 150 disposed within the vessel includes a float member 170 defining a throughbore 172 through which a guide rod 174 extends. The position of the float with respect to the guide rod 174 is determined by a pair of upper and lower guide stops 176, 178 which are adjustable. The lower end of the guide rod mounts the valve member 156 which is engageable with a seat 182 defined by the extension member 152.

As explained above, when the control spool 52' is in the lower position (shown in FIG. 2), fluid in the supply passage 54' can travel through the spool (by way of the internal passage 77') and out through the radial bores 74' defined in the spool housing 50'. In this embodiment, fluid leaving the radial bores 74' enters the passage 154 defined by the extension member and travels into the vessel 42' as long as the shut-off valve 156 is spaced from the valve seat 182. As the vessel fills with fluid, the top of the float 170' engages the upper stop 176 and gradually raises the shut-off valve 156. When the fluid reaches a predetermined level, the shut-off valve engages its associated seat 182 and prevents further flow of fluid from the passage 154 into the vessel 42'. The passage 154 then gradually pressurizes and as in the first embodiment, when fluid is no longer able to proceed into the vessel 42', the pressure of the supply shifts the spool member 52 upwardly to its second position (shown in FIG. 2). In this position, the extension member passage 154 is communicated with the outlet ports 76' defined in the valve housing 50'. Fluid in the passage 154 will discharge into the brine reservoir. As the passage 154 drains, the reduction of force on the shut-off valve 156 will cause it to open to allow fluid from the vessel to also drain into the brine reservoir.

According to a feature of this embodiment, the upper region of the vessel 42' is enclosed by a top cover 190 including a barbed discharge overflow port 192. The port is connected to a drain conduit 196 which in the preferred embodiment extends through brine reservoir tank 20' and may be connected to a suitable drain. With this embodiment, should a failure in the brine valve 30' occur that would prevent the spool 52' (or shut-off valve 156) from sealing off the supply of fluid, the excess fluid would be diverted to a drain or other suitable location and not cause an overflow of brine solution.

Although the invention has been described with a certain degree of particularity it should be understood that those skilled in the art can make various changes to it without departing from the spirit or scope as hereinafter claimed.

We claim:

1. A brining system, comprising:
   (a) a brine reservoir including a supply of salt;
   (b) a brine valve assembly disposed inside of said reservoir and comprising:
      (i) a control valve including an inlet port through which brine solution is drawn from said reservoir during a regeneration cycle;
      (ii) said control valve defining a spool housing in which a control spool is slidably mounted for movement between at least two positions;
      (iii) said control spool including means operative in one position to establish fluid communication between a fluid supply line and a fluid accumulating vessel forming part of said brine valve assembly in order to fill said vessel with a predetermined amount of a brine solution fluid, and further operative in another position to establish fluid communication between said vessel and said brine reservoir in order to discharge said fluid accumulated by said vessel into said brine reservoir to mix with said salt to form said brine solution;
      (iv) means for shifting said spool between said two positions including means for sensing when said predetermined amount of brine solution fluid has been accumulated in said vessel and when said fluid supply line is above a predetermined pressure.

2. The system of claim 1 wherein said accumulating vessel includes a float mechanism for operating a shut off valve for terminating the flow of fluid into said vessel when the fluid in said vessel reaches a predetermined level.

3. The system of claim 2 further comprising an overflow arrangement forming part of said vessel for directing excess fluid entering said vessel to a location outside of said brine reservoir.

4. The brining system of claim 1 wherein said brine valve assembly is disposed below a level of said supply of salt.

5. A brine valve assembly for use within a brine reservoir below the level of a salt supply, comprising:
   (a) a valve housing communicating with a fluid supply line through a supply passage, said supply passage communicating with a brine reservoir through a check valve controlled port;
   (b) a valve member for movement between two positions and being mounted in said valve housing.
   (c) a fluid accumulating vessel forming part of the brine valve assembly for accumulating a predetermined amount of constituent fluid to be discharged into said brine reservoir to mix with salt of said salt supply in order to at least partially form a regeneration solution;
   (d) said valve housing including at least one accumulating vessel input port and arranged with respect to said valve member so as to be controlled by said valve member for communicating fluid from said supply passage to said accumulating vessel when said valve member is in a first position;
   (e) said housing further defining discharge ports through which said predetermined amount of said constituent fluid from said fluid accumulating vessel is discharged into said brine reservoir when said valve member is in a second position; and
   (f) said valve member including structure defining effective pressure areas, one of said areas exposed to pressure of fluid being delivered to said accumulating vessel, the other of said effective pressure areas exposed to pressure in said supply passage, said fluid pressures applied to said effective pressure areas producing unbalanced forces on said valve member causing it to shift between said first and second positions upon reaching a predetermined level of force imbalance.

6. The assembly of claim 5 wherein said accumulating vessel includes a float mechanism operatively coupled to a shut off valve for terminating the flow of fluid from said supply passage into said accumulating vessel when the fluid in said accumulating vessel reaches a predetermined level.

7. The assembly of claim 6 wherein said float mechanism includes an adjustable float for adjusting said predetermined level at which said shut off valve terminates fluid flow into said vessel.

8. The assembly of claim 5 wherein said accumulating vessel includes a check ball-controlled vent port which is sealed when the fluid in said vessel reaches a predetermined level.

9. The assembly of claim 5 wherein said valve member comprises a spool defining an axial passage communicating with said supply passage through a check valve and further comprises at least one cross bore communicating with said axial passage for communicating the interior of said spool with said accumulating vessel input port when said spool is in said first position.

10. The assembly of claim 5 wherein said valve housing and accumulating vessel are constructed from a molded plastic.

11. A water softening system, comprising:
 (a) at least one resin tank including structure for defining a flow path for water to be treated;
 (b) regenerating apparatus for regenerating an exhausted resin in said resin tank, comprising:
  (i) a regeneration solution reservoir including a material for producing a regeneration solution when dissolved with water;
  (ii) a valve assembly in fluid communication with said solution reservoir for controlling the discharge of water from a water accumulating tank into said reservoir and the outflow of regeneration solution from said reservoir;
  (iii) said valve assembly including a valve housing and a valve member mounted in said housing for movement between two positions;
  (iv) said accumulating tank forming part of said valve assembly and operative to accumulate a predetermined quantity of water to be discharged into said reservoir to form a predetermined quantity of regeneration solution;
  (v) said valve member including member operating means responsive to changes in pressure in a fluid supply line and operative to shift said valve member to a first position at which said supply line is communicated with said accumulating tank until water in said tank reaches a predetermined quantity whereupon said operating means shifts said valve member to its second position at which discharge means forming part of said valve housing is rendered operative to discharge said water accumulated in said tank into said reservoir.

12. The system of claim 11 wherein said valve member comprises a valve spool including an axial passage communicating with said supply line through a check valve and further including passage means for communicating said axial passage with said accumulating vessel when said spool is in a first position.

13. The system of claim 11 wherein said accumulating vessel further comprises a float mechanism operatively connected to a shut off valve for terminating the flow of fluid into said accumulating vessel from said supply line when a predetermined level is reached in said accumulating vessel.

* * * * *